Patented Aug. 3, 1943

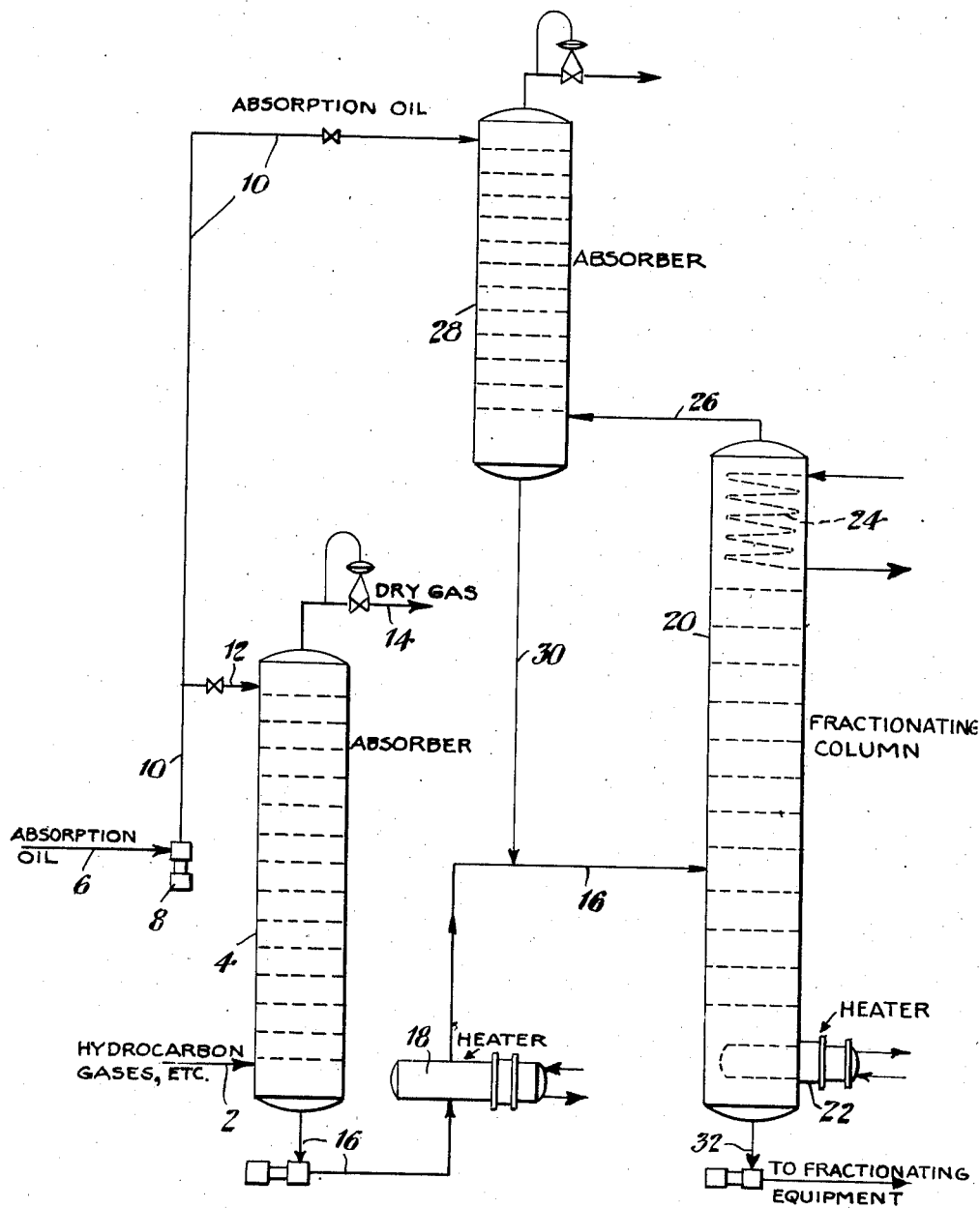

2,325,588

UNITED STATES PATENT OFFICE 2,325,588

RECOVERY AND FRACTIONATION OF LIGHT HYDROCARBONS

David G. Brandt, Westfield, N. J., assignor to Cities Service Oil Company, New York, N. Y., a corporation of Pennsylvania Application December 27, 1940, Serial No. 371,929

4 Claims. (Cl. 196—8)

This invention relates to a process for recovering and fractionating light hydrocarbons such as those contained in natural gas, in the gases from various types of oil conversion processes, and in gases from other sources.

This application contains a part of the disclosure of and is therefore a continuation-in-part of the applicant's pending application Serial No. 225,079, filed August 16, 1938 for "Conversion of mineral oils."

This pending application relates to the recovery and handling of hydrocarbons and discloses the steps of utilizing some of the heavier hydrocarbons such as gasoline and higher boiling constituents for condensing and absorbing the lighter hydrocarbons. The application also discloses a process for fractionating the recovered products. In accordance with the process described in the application, the mixture of hydrocarbon products comprising the gasoline, higher boiling constituents and hydrocarbons of lower boiling point than gasoline, such as hydrogen, methane, ethane and ethylene, are subjected to cooling and condensing conditions, so that substantially everything is condensed or absorbed in the hydrocarbon mixture except some $C_2$ hydrocarbons and lower boiling constituents. The resulting mixture is thereupon conducted into a vapor-liquid separator from which the vapors or gases are conducted into an absorption tower where they are brought in contact with an absorption oil under a pressure of from 175 to 250 lbs. per square inch. The absorption oil is a heavy condensate and might be of the character of a heavy gasoline or of the type of a recycle oil used in the cracking operation. The distillate stock used as an absorption medium in the absorber might also be produced from the mixture of hydrocarbons undergoing treatment in a preliminary partial condenser, the condensate to be used as an absorption medium being stripped of light constituents. The relatively high pressure used in the absorber, together with the intimate contact of the absorption oil, prevents the removal of $C_3$ and $C_4$ hydrocarbons with gases of lower molecular weight which are discharged from the upper part of the absorber through an automatic pressure valve controlled line. The rich absorption mixture produced in the absorber is added directly to the condensate recovered in the separator and subjected to a fractionating operation.

In accordance with the further disclosure of the said pending application, the hydrocarbon mixture obtained as described above is pumped into the mid-portion of a fractionating tower maintained at a pressure of approximately 500 lbs. per square inch for the purpose of eliminating excessively volatile constituents comprising $C_2$ hydrocarbons and lower molecular weight gases which were dissolved in the mixture. A temperature of approximately 375° F. is maintained in the bottom of the tower and the vapors evolved therein pass upwardly therethrough countercurrent to reflux condensate produced from a cooler with which the vapors reaching the top of the tower are brought in contact. Uncondensed vapors and gases including $C_2$ hydrocarbons and lower gases, as well as some $C_3$ hydrocarbons are removed from the high pressure fractionating tower and conducted into the lower portion of a second absorber or scrubber in which they pass upwardly therein countercurrent to a heavy distillate absorption oil of the type used in the absorber described above. This heavy distillate absorbing medium takes up the $C_3$ hydrocarbon from the gases, and the $C_2$ hydrocarbons and other lower gases are permitted to escape from the absorber. The rich absorption oil collected in the bottom of the second absorber is conducted into the high pressure fractionating tower for fractionation along with the hydrocarbon mixture introduced thereinto. The pressure in the second absorber connected with the outlet of the high pressure tower may be approximately 500 lbs., or considerably higher if desired, so that any $C_3$ hydrocarbons will be absorbed and returned to the mixture being fractionated in the tower. The hydrocarbon mixture reaching the bottom of the high pressure tower will be substantially free of undesired gaseous constituents including those as high as the $C_2$ hydrocarbons, and this mixture is subjected to subsequent fractionation for the production of desired hydrocarbon fractions. The present invention relates to the problem of recovering light hydrocarbons such as $C_3$ and $C_4$ hydrocarbons and their separation from $C_2$ and lower molecular weight hydrocarbons. While this separation in a rough way has been accomplished commercially, it is practically impossible by present methods to make a direct fractionation of a mixture of such hydrocarbons and separate the $C_2$ from the $C_3$ constituents at the high pressures which are desirable for the economical handling of such hydrocarbon mixtures. When $C_2$ and $C_3$ hydrocarbons are subjected to rectification under pressures of the order of 500 lbs. per square inch, considerable $C_3$ hydrocarbon will invariably go overhead with the $C_2$ hydrocarbon because the $C_3$ hydrocarbons are so near their critical conditions that there is practically no heat of vaporization required to distill them over.

The separation of $C_2$ and $C_3$ hydrocarbons recovered from natural gas is often very difficult because little or no lighter hydrocarbon is absorbed which would be useful in the subsequent fractionation to exert a partial pressure effect in the reflux. A reflux composed only of ethane at the high pressure necessary would have practically no cooling effect because the temperature is about the same as the critical temperature of ethane, where the heat of vaporization is substantially zero. It has been found that if a reflux containing two or more hydrocarbons is used, it is possible, because of the partial pressure effects of the two or more hydrocarbons, to get away from the effect of the critical conditions of the single hydrocarbon. The present invention therefore is an improvement in the recovery and rectification of such hydrocarbon mixtures which is particularly adapted for the recovery of $C_3$ hydrocarbons and to effect separation of $C_2$, and lower molecular weight constituents from hydrocarbon mixtures.

The primary object of the present invention is to provide an improved process for the recovery of light hydrocarbons and the high pressure fractionation of the same to more effectively segregate the low molecular weight constituents of the type of the $C_2$ hydrocarbons.

Another object of the invention is to provide a process which is particularly adapted for the recovery of $C_3$ hydrocarbons from mixtures containing $C_2$ hydrocarbons. The features of the present invention are substantially disclosed in pending application Serial No. 225,079, but other objects and advantages will be apparent from the following detailed description of the invention taken in connection with the accompanying drawing in which:

The single figure is a conventional elevational diagram of an apparatus particularly adapted for carrying out the improvements of the present invention.

Referring to the drawing, the hydrocarbon mixture to be treated and which may be derived from any source such as natural gas, crude petroleum or from various types of hydrocarbon conversion operations, and which may comprise hydrocarbons boiling in the gasoline range as well as both lower and higher boiling hydrocarbons, is introduced into the apparatus through a line 2 into the lower portion of an absorber 4, preferably after being cooled to a certain extent sufficient to condense all of the readily condensable constituents. The uncondensed gaseous hydrocarbons of the mixture introduced into the absorber 4 and not absorbed in the liquid constituents, pass upwardly through the absorber in contact with an absorption oil introduced into the apparatus through a line 6 and forced by means of a pump 8 through lines 10 and 12, into the upper part of the absorber. The pressure and temperature maintained in the absorber is preferably such that all $C_3$ and higher molecular weight hydrocarbons are absorbed, the unabsorbed constituents which may comprise essentially $C_2$ and lower molecular weight gases being discharged from the top of the absorber 4 through a pressure valve controlled line 14. The pressure in the absorber 4 may range from 200 to 1100 lbs. per square inch, depending upon the material being processed.

The absorption oil introduced into the apparatus through the line 6 may be obtained from any source and comprise any suitable oil adapted to perform the absorption referred to. The absorption medium may be a distillate produced at a later stage in the process from the hydrocarbon mixture introduced through the line 2 such as a distillate of higher boiling point than gasoline, and substantially free of light constituents.

The rich absorption oil reaching the bottom of the absorber 4 is mixed directly with the liquid hydrocarbons introduced through the line 2, and the resulting mixture is withdrawn through a line 16 and forced by means of a pump therein at a high pressure of from 500 to 650 lbs. per square inch through a heater 18 and then into a fractionating column 20 preferably at an intermediate point as shown. The fractionating column 20 is used primarily to carry out a rectifying operation adapted to separate $C_2$ and any lower molecular weight constituents from the hydrocarbon mixture, in order to produce a bottoms product substantially free of such constituents and which will therefore be more readily handled in subsequent fractionating operations. The mixture in the line 16 which may be heated to a suitable temperature such as of from 250° to 300° F., is rectified in the column 20 at pressures approximately within the range referred to above. In carrying out the fractionation in column 20 the bottom of the column is heated by means of a heater 22 or by other suitable reboiler, to maintain the necessary temperature, such as approximately 375° F. The stock supplied to the line 2, if hot enough, may be used in heaters 18 and 22 to do the necessary heating. At the same time the top of the column 20 is preferably cooled to produce a refluxing action, as for example, by means of a cooling coil 24. Other means for supplying reflux to the column 20 may be provided instead of employing the cooling coil 24.

Under the conditions specified for the column 20, it has been found practically impossible to make a clean cut between the $C_3$ and the $C_2$ hydrocarbons because the cooling and refluxing at the high pressures employed seem to have little influence in retaining sufficient $C_2$ for reflux purposes, for the reasons pointed out above. Therefore, the overhead vapor fraction produced by the column 20, in accordance with the present process, comprises $C_2$ hydrocarbon as well as some $C_3$ hydrocarbon, and possibly some isobutane or other $C_4$. This mixture is conducted from the column 20 through a vapor line 26 into an absorber 28 which is operated at a pressure only slightly lower than that maintained in the column 20. In the apparatus as shown, the pressure in the absorber 28 will be slightly lower to provide for vapor flow from the column 20. The absorption medium used in the absorber 28 may be of the same type as that supplied to the absorber 4 and therefore may be introduced into the top of absorber 28 through the valved extension of line 10.

The absorption oil introduced into the absorbers 4 and 28 may be as cool as desired and the rich absorption oil contained in the bottom of the absorber 28 is passed into the column 20 as for example, through a line 30, which discharges into the line 16, leading to the column 20. A pump may be provided in the line 30, or the absorber 28 be elevated as shown to obtain gravity flow to column 20. The absorption oil in the absorber 28 is preferably supplied at a rate and temperature adapted to absorb substantially all of the $C_3$ and higher hydrocarbons contained in the vapor or gas stream in the line 26. The absorber 28 therefore performs a very important function in recovering the $C_3$ and higher hydrocarbon which would otherwise be lost, and in supplying it back to the fractionating column 20 where it is of value in the rectification of the hydrocarbon mixture, because it serves to create a partial pressure effect which avoids the critical conditions of the $C_2$ hydrocarbons in refluxing the column. The unabsorbed gases reaching the top of the absorber 28 may be discharged through a pressure valve controlled line as shown and used for fuel, or be passed under pressure into the lower portion of absorber 4, if desirable, for the recovey of $C_2$ or other constituents.

The hydrocarbon mixture recovered in the bottom of the column 20 under the conditions described above will be completely free of any $C_2$ or lower molecular weight constituents. A sufficiently high temperature is maintained in the bottom of the column 20 for this purpose. This mixture is withdrawn from the column through a line 32, and passed by means of a pump therein to other fractionating equipment, where the mixture may be fractionated to produce the desired individual fractions, such for example as $C_3$ and $C_4$ fractions, a gasoline, furnace oil and other higher boiling distillates, in accordance with the composition of the original mixture introduced into the apparatus through the line 2'. Such fractionation will be found to be greatly simplified and much more easily carried out because of the absence of $C_2$ and lower molecular weight constituents in the material discharged through the line 32. It will be noted furthermore that in the operation as described the $C_3$ hydrocarbon is recovered without the use of compressors, and that nothing but liquids are pumped. This is of considerable importance in a commercial operation.

It is to be understood that various modifications may be made in the process of the present invention without departing from the definition thereof as presented in the accompanying claims. It is to be further understood that the process is not limited to the handling of any particular hydrocarbon mixture but that the process may be applied to the treatment of hydrocarbon mixtures to be handled in the various arts, such as in the conversion of hydrocarbons, the recovery of hydrocarbons from natural gas, crude petroleum and other sources.

Having thus described the invention, what is claimed as new is:

1. The process of recovering desirable hydrocarbon constituents from mixtures of hydrocarbons containing hydrocarbons normally within the gasoline range as well as higher boiling constituents and constituents of lower molecular weight such as $C_3$ and $C_2$, which comprises passing the hydrocarbon mixture to be treated containing said constituents into the lower portion of an absorption tower in which the gaseous constituents are brought in intimate contact with an absorbing medium which is introduced into the upper portion of the tower, effecting the intimate contact under conditions adapted to retain in the tower substantially all of the $C_3$ and higher molecular weight hydrocarbons, discharging unabsorbed $C_2$ and lower molecular weight hydrocarbons from the upper part of the absorption tower, passing the rich absorption medium and recovered hydrocarbons of the hydrocarbon mixture introduced into the tower from the base of the absorption tower into a factionating column at a point below the mid-point thereof and rectifying the hydrocarbon mixture under refluxing conditions produced by the cooling of vapors at the top of the column, maintaining a bottom temperature in the fractionating column adapted to produce a bottoms product containing $C_3$ hydrocarbon but which is substantially free of $C_2$ hydrocarbon, discharging the bottoms product containing $C_3$ hydrocarbon from the bottom of the column, passing a vapor fraction discharged from the top of the fractionating column and comprising $C_3$ and lower molecular weight hydrocarbons but which is substantially free of higher molecular weight hydrocarbons into the lower portion of a second absorption tower separate from said column and passing said vapor fraction in intimate contact with an absorption medium adapted to absorb substantially all of the $C_3$ hydrocarbon of the vapor fraction introduced into said second absorption tower, maintaining a high pressure in said second absorption tower substantially equal to that maintained in said fractionating column, discharging $C_2$ hydrocarbon in vapor form from the top of said second absorption tower, and passing the rich absorption medium from said second absorption tower into said fractionating column at an intermediate point to return $C_3$ hydrocarbon thereto.

2. The process of recovering desirable hydrocarbon constituents from mixtures of hydrocarbons containing hydrocarbons normally within the gasoline range and constituents of lower molecular weight such as $C_3$ and $C_2$ hydrocarbons, which comprises passing the hydrocarbon mixture to be treated into the lower portion of an absorption tower in which the gaseous constituents are brought in intimate contact with an absorbing medium under conditions adapted to retain in the tower substantially all of the $C_3$ and higher molecular weight hydrocarbons as well as some $C_2$ hydrocarbon, discharging unabsorbed gaseous hydrocarbon from the upper part of the absorption tower, passing the rich absorption medium and recovered hydrocarbons from the base of the tower into a fractionating column at an intermediate point in which the hydrocarbon mixture is subjected to rectification at a high pressure of the order of 500 lbs. per square inch and under overhead refluxing conditions, maintaining a bottom temperature in the fractionating column adapted to produce a bottoms product containing $C_3$ hydrocarbon but which is substantially free of $C_2$ hydrocarbons, passing a vapor mixture comprising $C_3$ and lower molecular weight hydrocarbons removed from the top of said fractionating column and which is substantially free of normally liquid hydrocarbons into a second absorption tower in intimate contact with an absorption medium adapted to absorb substantially all of the $C_3$ hydrocarbon of the vapor mixture introduced thereinto, said second absorption tower being separate from said column, maintaining a high pressure in said second absorption tower substantially equal to that maintained in said fractionating column, discharging $C_2$ hydrocarbon from the top of said second absorption column, and passing the rich absorption medium from said second absorption tower into said fractionating column at an intermediate point.

3. In the fractionation of hydrocarbon mixtures containing $C_3$ hydrocarbon and hydrocarbon material of higher and lower molecular weight in which the fractionation is carried out for the purpose of recovering $C_3$ and producing a liquid fraction substantially free of $C_2$ hydrocarbon, the improvement which comprises passing the hydrocarbon mixture to be treated containing $C_3$ hydrocarbon and said hydrocarbon material into the lower portion of an absorption tower in which the gaseous constituents are brought in intimate contact with an absorbing medium under conditions adapted to retain in the tower substantially all of the $C_3$ and higher molecular weight hydrocarbons as well as some $C_2$ hydrocarbons, discharging unabsorbed gaseous hydrocarbon from the upper part of the absorption tower, passing the rich absorption medium and recovered hydrocarbons from the base of the tower into a fractionating column at a point below the mid-point thereof and rectifying the hydrocarbon mixture under overhead refluxing conditions, maintaining a bottom temperature in the fractionating column adapted to produce a bottoms product containing $C_3$ hydrocarbon but which is substantially free of $C_2$ hydrocarbons, discharging the bottoms product containing $C_3$ hydrocarbon from the bottom of the column, passing a vapor mixture comprising $C_3$ and lower molecular weight hydrocarbons removed from the top of said fractionating column and which is substantially free of normally liquid hydrocarbons into a second absorption tower in intimate contact with an absorption medium adapted to absorb substantially all of the $C_3$ hydrocarbon of the vapor mixture introduced thereinto, said second absorption tower being separate from said column, maintaining a high pressure in said second absorption tower substantially equal to that maintained in said fractionating column, discharging $C_2$ hydrocarbon from the top of said second absorption column, and passing the rich absorption medium from said second absorption tower into said fractionating column.

4. In the fractionation of hydrocarbon mixtures containing $C_2$ and $C_3$ hydrocarbons and hydrocarbon material of higher molecular weight in which the fractionation is carried out for the purpose of recovering $C_3$ and producing a liquid fraction substantially free of $C_2$ hydrocarbon, the improvement which comprises passing the hydrocarbon mixture to be fractionated containing $C_2$ and $C_3$ hydrocarbons and said hydrocarbon material into a fractionating column and rectifying the mixture therein under refluxing conditions at a high pressure of the order of approximately 500 lbs. per square inch under which the heat of vaporization of $C_2$ hydrocarbons alone are extremely low, cooling the vapors to produce reflux liquid at the top of said column, maintaining a temperature in the bottom of the fractionating column adapted to produce a bottoms product containing $C_3$ hydrocarbon but which is substantially free of $C_2$ hydrocarbon, discharging the bottoms product containing $C_3$ hydrocarbon from the bottom of the column, passing a mixture of vapors removed from the top of the fractionating column and comprising $C_3$ and lower molecular weight hydrocarbon but which is substantially free of higher molecular weight hydrocarbons into a high pressure absorber which is separate from said column and in which a high pressure is maintained, passing the vapors introduced into said absorber in intimate contact with an absorption medium adapted under the conditions maintained in said absorber to absorb and recover substantially all of the $C_3$ hydrocarbon introduced thereinto in said vapor mixture, discharging $C_2$ hydrocarbon in vapor form from said absorber, and passing the rich absorption medium from said absorber and introducing it into said fractionating column at an intermediate point, whereby a constant cycle of $C_3$ hydrocarbon is maintained between the fractionating column and the absorber to provide a reflux in said column containing a mixture of hydrocarbons including $C_2$ and $C_3$.

DAVID G. BRANDT.